United States Patent Office 3,829,420
Patented Aug. 13, 1974

3,829,420
3,4-DIHYDRO-2(1H)-QUINAZOLINONES AND PREPARATION THEREOF
Shigeho Inaba, Takarazuka, Michihiro Yamamoto, Toyonaka, Kikuo Ishizumi, Ikeda, Kazuo Mori, Kobe, Masao Koshiba, Takarazuka, and Hisao Yamamoto, Nishinomiya, Japan, assignors to Sumitomo Chemical Company Limited, Osaka, Japan
No Drawing. Filed July 8, 1971, Ser. No. 160,947
Claims priority, application Japan, July 13, 1970, 45/61,618; Nov. 5, 1970, 45/98,107; Dec. 23, 1970, 45/118,332
Int. Cl. C07d 51/48
U.S. Cl. 260—251 QB                7 Claims

ABSTRACT OF THE DISCLOSURE

Quinazoline derivatives represented by the formula,

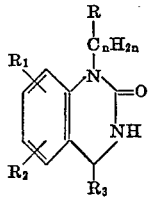

wherein $R_1$ and $R_2$ are individually a hydrogen, a lower alkyl, a lower alkoxy, a nitro, a trifluoromethyl, a lower alkylthio, a lower alkylsulfonyl or a halogen; $R_3$ is a group of the formula

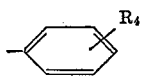

(wherein $R_4$ is a hydrogen, a lower alkyl, a lower alkoxy, a trifluoromethyl or a halogen), a naphthyl, a lower cycloalkyl, a lower cycloalkenyl, a pyridyl, a pyrrolyl, a thienyl or a furyl; R is a lower cycloalkyl, a trihalomethyl, a lower alkoxy, a lower alkylthio, a lower alkanoyloxy or a group of the formula

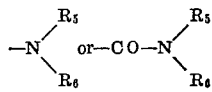

(wherein $R_5$ and $R_6$ are individually a lower alkyl provided that $R_5$ and $R_6$ may form together with the adjacent nitrogen an unsubstituted or optionally substituted 5- or 6-membered heterocyclic ring, which may further contain a nitrogen, an oxygen or a sulfur); and n is an integer of 1 to 3. These quinazoline derivatives have excellent pharmacological properties particularly anti-inflammatory and analgesic effects with low toxicity.

This invention relates to novel quinazoline derivatives and processes for the production thereof.
More particularly, this invention pertains to novel quinazoline derivatives represented by the formula,

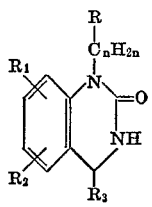

(I)

wherein $R_1$ and $R_2$ are individually a hydrogen atom, a lower alkyl group, a lower alkoxy group, a nitro group, a trifluoromethyl group, a lower alkylthio group, a lower alkylsulfonyl group or a halogen atom; $R_3$ is a group of the formula

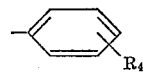

(wherein $R_4$ is a hydrogen atom, a lower alkyl group, a lower alkoxy group, a trifluoromethyl group or a halogen atom), a naphthyl group, a lower cycloalkyl group, a lower cycloalkenyl group, a pyridyl group, a pyrrolyl group, a thienyl group or a furyl group; R is a lower cycloalkyl group, a trihalomethyl group, a lower alkoxy group, a lower alkylthio group, a lower alkanaoyloxy group or a group of the formula

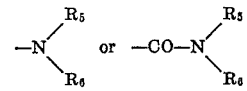

(wherein $R_5$ and $R_6$ are individually a lower alkyl group provided that $R_5$ and $R_6$ may form together with the adjacent nitrogen atom an unsubstituted or optionally substituted 5- or 6-membered heterocyclic ring, which may further contain a nitrogen, an oxygen or a sulfur atom); and n is an integer of 1 to 3, and the methods for the production of the same.

In the compounds represented by the formula (I), the lower alkyl group includes, for example, methyl, ethyl, n-propyl, isopropyl, n-butyl, isobutyl or t-butyl; the lower alkoxy group includes, for example, methoxy, ethoxy, n-propoxy, isopropoxy, n-butoxy, isobutoxy and tertiary butoxy; the lower cycloalkyl group includes, for example, cyclopropyl, cyclobutyl, cyclopentyl, cyclohexyl, methyl cyclopropyl and dimethyl cyclopropyl; the lower alkanoyloxy group includes, for example, acetoxy and propionyloxy; the trihalomethyl group includes, for example, trifluoromethyl, trichloromethyl and chloro-difluoromethyl; and the halogen atom includes fluorine, chlorine, bromine and iodine. The alkylene group represented by the formula $C_nH_{2n}$ includes, for example, methylene, ethylene, 1 - methylethylene, 2-methylethylene and trimethylene.

The quinazoline derivatives of the formula (I), which have not been described in any literature, have excellent anti-inflammatory and analgesic activity with low toxicity and they are also useful as intermediates for preparing other medicines. The anti-inflammatory activity of these compounds is more potent than that of 1,2-diphenyl-3,5-dioxo-4-n-butylpyrazolidine (phenylbutazone), and the acute, subacute and chronic toxicities are much lower than these of phenylbutazone.

Thus, an object of the present invention is to provide novel quinazoline derivatives represented by the formula (I) which have excellent anti-inflammatory effects. Another object of the present invention is to provide a novel process for producing commercially such valuable quinazoline derivatives. A further object of the present invention is to provide a pharmaceutically acceptable composition containing one or more quinazoline derivatives. A still further object of the present invention will be apparent from the following description.

According to the present invention, the novel quinazoline derivatives represented by the formula (I) can be prepared by several methods which are illustrated in the following descriptions.

One method for preparing quinazoline derivatives represented by the formula (I) comprises reacting a compound represented by the formula,

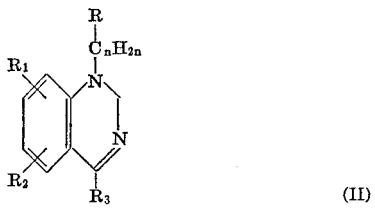

(II)

wherein $R_1$, $R_2$, $R_3$, R and $n$ are as defined above, with a reducing agent in the presence of an inert solvent or solvent mixture.

The reducing agents which may be employed are complex metal hydrides such as sodium borohydride, lithium borohydride, lithium aluminum hydride, diisobutyl aluminum hydride and mixed metal hydrides; hydrogen together with a catalyst such as nickel, palladium, platinum oxide, copper or cobalt. Besides, other conventional methods for reducing a carbon-nitrogen double bond may be used in this reaction.

The selection of the solvent is dependent on the reducing agent employed. Examples of the suitable solvent are methanol, ethanol, isopropanol, ethyl acetate, acetic acid, water, methylene chloride, chloroform, carbon tetrachloride, ether, tetrahydrofuran, 1,2-dimethoxyethane, diglyme, dimethylformamide and the like. The reaction proceeds ordinarily at room temperature, but if necessary higher or lower reaction temperatures may be employed to effect the reaction under a desired control.

Another method for preparing quinazoline derivatives represented by the formula (I) comprises reacting a compound represented by the formula,

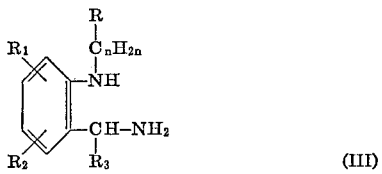

(III)

wherein $R_1$, $R_2$, $R_3$, R and $n$ are as defined above, with phosgene, N,N'-carbonyldiimidazole or lower alkyl haloformate.

The reaction may be preferably carried out in the presence of an inert solvent and an acid-binding agent.

Examples of the solvent are benzene, toluene, xylene, chloroform, ether, tetrahydrofuran, dioxane, dimethylformamide and the like.

Examples of the suitable acid-binding agent are tertiary organic bases such as triethylamine, tri-n-propylamine, pyridine, dimethyl aniline or N-methylpiperidine; alkali metal salts of organic acids such as sodium acetate or potassium acetate; and organic bases such as sodium hydroxide, potassium hydroxide, sodium carbonate or potassium carbonate.

Still another method for preparing quinazoline derivatives represented by the formula (I) comprises reacting a compound represented by the formula,

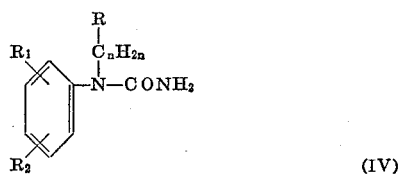

(IV)

wherein $R_1$, $R_2$, R and $n$ are as defined above, with a compound of the formula,

$R_3$—CHO  (V)

wherein $R_3$ is as defined above, in the presence of an anhydrous inert solvent and a catalytic amount of dehydrating agent.

Available dehydrating agents are, for example, arylsulfonic acids such as benzene sulfonic acid and p-toluenesulfonic acid; alkylsulfonic acids such as methanesulfonic acid and trichloromethane sulfonic acid; trifluoro acetic acid; alcoholic hydrogen chloride such as methanolic hydrogen chloride and ethanolic hydrogen chloride.

Examples of the inert solvents are anhydrous benzene, toluene and the like.

The reaction may be preferably carried out at a temperature between 60° C. and a boiling point of the solvent employed.

Yet another method for preparing quinazoline derivative represented by the formula (I) comprises heating a compound represented by the formula,

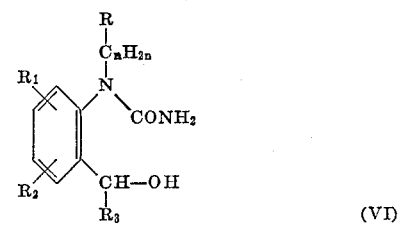

(VI)

wherein $R_1$, $R_2$, $R_3$, R and $n$ are as defined above, in the presence of an acid.

Available acids are, for example, mineral acids such as sulfuric acid and hydrochloric acid; and organic acids such as acetic acid and the like.

The reaction is usually carried out at a temperature between 90° C. and 120° C.

Further method for preparing quinazoline derivatives represented by the formula (I) comprises reacting a compound represented by the formula,

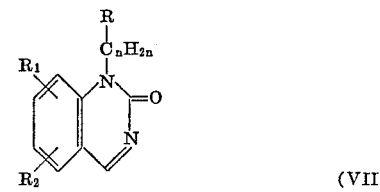

(VII)

wherein $R_1$, $R_2$, R and $n$ are as defined above, with a compound of the formula,

$R_3$—Y  (VIII)

wherein $R_3$ is a defined above, and Y is a lithium atom, MgCl, MgBr or MgI, in the presence of an anhydrous inert solvent, followed by hydrolysis.

Examples of the suitable solvent are benzene, toluene, ether, dimethoxyethane, tetrahydrofuran, dioxane and a mixture thereof.

The reaction may be preferably effected by using the compound of the formula (VIII) in excess under anhydrous conditions. The hydrolysis of the reaction product may be carried out in a usual manner.

The other method for preparing quinazoline derivatives represented by the formula (I) comprises hydrolyzing a compound represented by the formula,

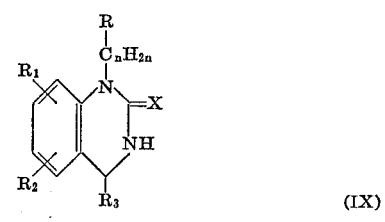

(IX)

wherein $R_1$, $R_2$, $R_3$, R and $n$ are as defined above, and X is a sulfur atom or an imino group.

The hydrolysis may be suitably carried out under heating in the presence of a solvent or a solvent mixture and an acid or a base.

Available solvents are, for example, methanol, ethanol, isopropanol, water, dioxane and dimethylsulfoxide.

Examples of the acid are mineral acids such as hydrochloric acid, sulfuric acid and phosphoric acid.

Examples of the base are an alkali metal hydroxide such as sodium hydroxide and potassium hydroxide; an alkali metal carbonate such as sodium carbonate and potassium carbonate; an alkline earth metal hydroxide such as calcium hydroxide and barium hydroxide; and ammonium hydroxide.

This invention is further explained referring to the following examples of more preferred embodiments thereof, which are presented for the purpose of illustration and are not intended to limit the scope of the invention.

EXAMPLE 1

To a suspension of 6.22 g. of 1-cyclopropylmethyl-4-phenyl-6-chloro-2(1H)-quinazolinone in 150 ml. of isopropyl alcohol was added by portions 0.83 g. of sodium borohydride.

The mixture was stirred at room temperature for 2 hours, and then the solvent was removed under reduced pressure. The residue was washed with water, collected by filtration and dried to give 6.25 g. of 1-cyclopropylmethyl-4-phenyl-6-chloro - 3,4 - dihydro-2(1H)-quinazolinone. Recrystallization from ethanol gave colorless needles, having a melting point of 166.0–167.0° C.

EXAMPLE 2

To a solution of 3.11 g. of 1-cyclopropylmethyl-4-phenyl-6-chloro-2(1H)-quinazolinone in 50 ml. of acetic acid was added 0.40 g. of platinum oxide catalyst, and the mixture was shaken at room temperature with hydrogen until one molecular equivalent of hydrogen was absorbed. After the catalyst was filtered off, the filtrate was evaporated to dryness under reduced pressure. The residue was recrystallized from ethanol to give 2.90 g. of 1-cyclopropylmethyl - 4 - phenyl - 6 - chloro - 3,4 - dihydro-2(1H)-quinazolinone, having a melting point of 165.0–166.0° C.

EXAMPLE 3

In a similar procedure to Example 1 or Example 2 there are obtained the following quinazoline derivatives from an appropriate starting material:

1-cyclopropylmethyl-4-phenyl-6-fluoro-3,4-dihydro-2(1H)-quinazolinone, m.p. 158.0–159.0° C.;
1-cyclopropylmethyl-4-phenyl-6,7-dichloro-3,4-dihydro-2(1H)-quinazolinone, m.p. 170.5–171.5° C.;
1-cyclopropylmethyl-4-phenyl-6-methyl-3,4-dihydro-2(1H)-quinazolinone, m.p. 131.0–132.0° C.;
1-cyclopropylmethyl-4-phenyl-6-methoxy-3,4-dihydro-2(1H)-quinazolinone, m.p. 137.0–138.0° C.;
1-cyclopropylmethyl-4-phenyl-6-nitro-3,4-dihydro-2(1H)-quinazolinone, m.p. 159.5–160.5° C.;
1-cyclopropylmethyl-4-phenyl-6-trifluoromethyl-3,4-dihydro-2(1H)-quinazolino, m.p. 161.5–162.5° C.;
1-(2'-ethoxyethyl)-4-phenyl-6-chloro-3,4-dihydro-2(1H)-quinazolinone, m.p. 127.0–128.5° C.;
1-(2'-ethoxyethyl)-4-(o-fluorophenyl)-6-chloro-3,4-dihydro-2(1H)-quinazolinone, m.p. 110.0–110.5° C.;
1-(2'-diethylaminoethyl)-4-(o-fluorophenyl)-6-chloro-3,4-dihydro-2(1H)-quinazolinone hydrochloride, m.p. 193° C. dec.;
1-(2',2',2'-trifluoroethyl)-4-phenyl-6-chloro-3,4-dihydro-2(1H)-quinazolinone, m.p. 171.0–172.0° C.;
1-cyclopropylmethyl-4-cyclohexyl-6-chloro-3,4-dihydro-2(1H)-quinazolinone, m.p. 176.5–177.5° C.;
1-cyclopropylmethyl-4-(2'-pyridyl)-6-chloro-3,4-dihydro-2(1H)-quinazolinone, m.p. 152.0–153.0° C.; and
1-cyclopropylmethyl-4-(2'-thienyl)-6-chloro-3,4-dihydro-2(1H)-quinazolinone, m.p. 140.0–141.0° C.

EXAMPLE 4

To a mixture of 3.6 g. of 2-cyclopropylmethylamino-5-chlorobenzhydrylamine dihydrochloride and 15 ml. of triethylamine in 100 ml. of benzene was added dropwise with stirring under cooling with ice 70 ml. of 10% phosgene solution in benzene. After the addition was completed the resulting mixture was further stirred at room temperature for 30 minutes and then evaporated to dryness under reduced pressure. To the residue were added 100 ml. of diluted aqueous sodium carbonate solution and 100 ml. of chloroform. The mixture was well stirred and then, the chloroform layer was separated and the aqueous layer was further extracted with chloroform. The combined organic layer was washed with water and dried over anhydrous sodium sulfate. The solvent was removed under reduced pressure and the residue was recrystallized from ethanol to give 1-cyclopropylmethyl-4-phenyl-6-chloro-3,4-dihydro-2(1H)-quinazolinone, having a melting point of 166.0–167.0° C.

EXAMPLE 5

To a solution of 25.5 g. of p-chloroaniline in 100 ml. of benzene was added by portions 8.3 g. of 64% sodium hydride.

The mixture was heated under reflux for 2 hours and cooled to room temperature. Then, 3.7 g. of cyclopropylmethyl bromide was added thereto. The mixture was heated under reflux for additional 9 hours. After cooling, the reaction mixture was washed with diluted hydrochloric acid solution, followed by water and dried over anhydrous sodium sulfate. The solvent was removed under reduced pressure to give N-cyclopropylmethyl-4-chloroaniline.

Subsequently, to a solution of N-cyclopropylmethyl-4-chloroaniline in 150 ml. of acetic acid was added 13.0 g. of sodium cyanate and the resulting mixture was stirred at room temperature for 20 hours. The reaction mixture was poured into 700 ml. of water and the resulting mixture was extracted with ether. The ether extract was washed with water and dried over anhydrous sodium sulfate, and the solvent was removed under reduced pressure to give oily brown residue, which was dissolved in a mixture of n-hexane and isopropyl ether and cooled to crystallize. The precipitated crystals were collected by filtration, washed with a n-hexane-ether mixture and dried to give 20.0 g. of N-cyclopropylmethyl-N-(p-chlorophenyl)urea. Recrystallization from ethanol-isopropyl ether gives colorless crystals having a melting point of 103.0–105.0° C.

In the next step, a mixture of 4.2 g. of N-cyclopropylmethyl-N-(p-chlorophenyl)urea, 2.0 g. of benzaldehyde and 0.1 g. of p-toluensulfonic acid in 100 ml. of anhydrous benzene was heated under reflux for 20 hours. After cooling, the reaction mixture was washed with water and dried over anhydrous sodium sulfate. The solvent was removed under reduced pressure and the residue was recrystallized from ethanol to give 1-cyclopropylmethyl - 4 - phenyl - 6 - chloro - 3,4 - dihydro - 2(1H)-quinazolinone, having a melting point of 166.0–167.0° C.

EXAMPLE 6

To a solution of 2.9 g. of 2-(2'-ethoxyethylamino)-5-chlorobenzhydrol was added 0.9 g. of potassium cyanate. The mixture was stirred and heated under reflux. After cooling, the reaction mixture was poured into water. The resulting mixture was extracted with chloroform and the chloroform extract was washed with diluted aqueous sodium hydroxide solution, followed by water, and dried over anhydrous sodium sulfate. The solvent was removed under reduced pressure and the residue was recrystallized from ethanol to give 1-(2'-ethoxyethyl)-4-phenyl-6-chloro-3,4-dihydro-2(1H)-quinazolinone, having a melting point of 127.0–128.5° C.

EXAMPLE 7

To a solution of 3.0 g. of 1-cyclopropylmethyl-6-chloro-2(1H)-quinazolinone in 400 ml. of anhydrous tetrahydrofuran was added a solution of 50 ml. of phenyl lithium in ether, which was prepared by the reaction of 25.0 g. of bromobenzene and 2.1 g. of lithium in a usual manner. The resultant mixture was stirred at room temperature. After the reaction mixture was concentrated, cold water was slowly added thereto. The resulting mixture was extracted with chloroform and the extract was washed with water and dried over anhydrous sodium sulfate. The solvent was removed under reduced pressure and the residue was recrystallized from ethanol to give 1-cyclopropylmethyl-4-phenyl - 6 - chloro-3,4-dihydro-2(1H)-quinazolinone, having a melting point of 165.0–166.0° C.

EXAMPLE 8

To a solution of 1.62 g. of 1-cyclopropylmethyl-4-phenyl - 6 - methoxy-3,4-dihydro-2(1H)-quinazolinethione in 50 ml. of methanol was added a solution of 1.2 g. of sodium hydroxide in 20 ml. of water. The mixture was heated under reflux for 2 hours, and then, the reaction mixture was concentrated. To the residue was added water, and the precipitate was collected by filtration, washed with water and dried to give 1-cyclopropylmethyl-4-phenyl-6-methoxy-3,4-dihydro - 2(1H) - quinazolinone, having a melting point of 136.0–137.0° C.

What is claimed is:

1. A compound of the formula

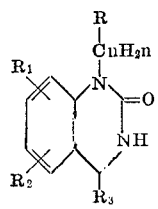

wherein $R_1$ is hydrogen or halogen; $R_2$ is hydrogen, halogen, $C_{1-4}$ alkyl, $C_{1-4}$ alkoxy, nitro or trifluoromethyl; $R_3$ is cyclo-$C_{3-6}$ alkyl or a group of the formula

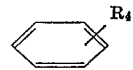

wherein $R_4$ is hydrogen or halogen; R is cyclo-$C_{3-6}$ alkyl and $n$ is an integer of 1 to 3.

2. A compound of claim 1, wherein R—$C_nH_{2n}$ is cyclopropylmethyl.

3. 1-Cyclo $C_{3-6}$ alkyl-$C_{1-3}$ alkyl-4-phenyl-6-chloro-3,4-dihydro-2(1H)-quinazolinone.

4. 1-Cyclo $C_{3-6}$ alkyl-$C_{1-3}$ alkyl-4-substituted phenyl-6-chloro - 3,4 - dihydro-2(1H)-quinazolinone, wherein the substituted phenyl is a group of the formula

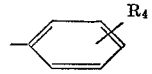

in which $R_4$ is $C_{1-4}$ alkyl, $C_{1-4}$ alkoxy, trifluoromethyl or halogen.

5. 1-Cyclo $C_{3-6}$ alkyl-$C_{1-3}$ alkyl-4-phenyl-6-halogeno-3,4-dihydro-2(1H)-quinazolinone.

6. 1-Cyclo $C_{3-6}$ alkyl-$C_{1-3}$ alkyl-4-substituted phenyl-6-halogeno - 3,4 - dihydro-2(1H)-quinazolinone, wherein the substituted phenyl is as defined in Claim 4.

7. 1-Cyclopropylmethyl - 4 - phenyl-6-chloro-3,4-dihydro-2(1H)-quinazolinone.

References Cited

UNITED STATES PATENTS 3,547,921   12/1970   Hardtmann et al. ____ 260—251

RAYMOND V. RUSH, Primary Examiner

U.S. Cl. X.R.

260—256.4 Q, 256.5 R, 294.8 R, 294.8 S, 295 R, 295 AM, 296 R, 326.47, 326.5 S, SF, L, 332.2 R, 347.2, 347.3, 347.4, 347.7, 553 A; 424—251